United States Patent
Zhu

(10) Patent No.: US 10,616,065 B2
(45) Date of Patent: Apr. 7, 2020

(54) NETWORK ASSISTED PROXIMITY SERVICE SESSION MANAGEMENT

(75) Inventor: Li Zhu, Willetton (AU)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/410,170

(22) PCT Filed: Jun. 21, 2012

(86) PCT No.: PCT/CN2012/077354
§ 371 (c)(1),
(2), (4) Date: Apr. 14, 2015

(87) PCT Pub. No.: WO2013/189078
PCT Pub. Date: Dec. 27, 2013

(65) Prior Publication Data
US 2015/0223274 A1    Aug. 6, 2015

(51) Int. Cl.
*H04L 12/24* (2006.01)
*H04W 76/11* (2018.01)
*H04W 4/21* (2018.01)
*H04W 76/30* (2018.01)
*H04W 76/14* (2018.01)
(Continued)

(52) U.S. Cl.
CPC .......... *H04L 41/12* (2013.01); *H04L 67/1061* (2013.01); *H04W 4/21* (2018.02); *H04W 4/70* (2018.02); *H04W 12/0013* (2019.01); *H04W 48/16* (2013.01); *H04W 64/00* (2013.01); *H04W 72/042* (2013.01); *H04W 72/0413* (2013.01);
(Continued)

(58) Field of Classification Search
CPC ... H04W 76/021; H04W 76/06; H04W 48/16; H04W 72/0413; H04W 72/042; H04W 4/001; H04W 4/50; H04W 76/02; H04W 76/10; H04W 76/30; H04W 84/12; H04L 67/1061; H04L 41/12; H04L 67/34; G06F 9/44563; H04M 1/72525; H04M 1/7253
USPC ................................................ 370/310–350
See application file for complete search history.

(56) References Cited

U.S. PATENT DOCUMENTS

2010/0009675 A1    1/2010  Wijting et al.
2011/0098043 A1*   4/2011  Yu .................... H04W 60/00
                                              455/435.1
(Continued)

FOREIGN PATENT DOCUMENTS

CN          1262565 A     8/2000
CN        101341686 A     1/2009
(Continued)

OTHER PUBLICATIONS

International Search Report and Written Opinion dated Feb. 28, 2013 corresponding to International Patent Application No. PCT/CN2012/077354.
(Continued)

*Primary Examiner* — Kan Yuen
(74) *Attorney, Agent, or Firm* — Squire Patton Boggs (US) LLP

(57) ABSTRACT

There are provided measures for network assisted proximity service session management. Such measures exemplarily comprise discovering a proximity service target, said proximity service target providing proximity service, and setting up, via uplink and downlink signaling, proximity service communication with said proximity service target.

33 Claims, 10 Drawing Sheets

S41: discovering a proximity service target, said proximity service target providing proximity service S42: setting up, via uplink and downlink signaling, proximity service communication with said proximity service target

(51) Int. Cl.

| | | |
|---|---|---|
| *H04W 12/00* | (2009.01) | |
| *H04W 4/70* | (2018.01) | |
| *H04L 29/08* | (2006.01) | |
| *H04W 48/16* | (2009.01) | |
| *H04W 64/00* | (2009.01) | |
| *H04W 72/04* | (2009.01) | |
| *H04W 12/04* | (2009.01) | |

(52) U.S. Cl.
CPC ............ *H04W 76/11* (2018.02); *H04W 76/14* (2018.02); *H04W 76/30* (2018.02); *H04W 12/04* (2013.01)

(56) References Cited

U.S. PATENT DOCUMENTS

| | | | | |
|---|---|---|---|---|
| 2011/0258313 A1* | 10/2011 | Mallik | .................. | H04W 8/005 709/224 |
| 2012/0151210 A1* | 6/2012 | Perez | ..................... | G06F 21/35 713/168 |
| 2012/0179789 A1* | 7/2012 | Griot | ..................... | H04W 12/08 709/220 |
| 2012/0208571 A1* | 8/2012 | Park | .................... | H04L 67/1063 455/466 |
| 2013/0159522 A1* | 6/2013 | Hakola | ............... | H04L 63/0823 709/225 |
| 2013/0290696 A1* | 10/2013 | Broustis | .................... | H04L 9/08 713/150 |
| 2014/0153390 A1* | 6/2014 | Ishii | .................. | H04W 28/0289 370/230 |
| 2015/0080002 A1* | 3/2015 | Cho | .................... | H04W 76/023 455/450 |

FOREIGN PATENT DOCUMENTS

| | | |
|---|---|---|
| CN | 101420413 A | 4/2009 |
| CN | 101444007 A | 5/2009 |
| CN | 101938691 A | 1/2011 |
| CN | 102143487 A | 8/2011 |
| CN | 102461128 A | 5/2012 |

OTHER PUBLICATIONS

S1-121087; Alcatel-Lucent; "FS_ProSe: ProSe Control Paths"; 3GPP TSG-SA WG1 #58; Seville, Spain, May 7-11, 2012, 3 pages.
European Search Report application No. 12879376.7 dated Nov. 19, 2015.
Chinese Patent Office, Office Action corresponding to Appln. No. 2012800751372.2, dated Jul. 19, 2017.

* cited by examiner

NETWORK ASSISTED PROXIMITY SERVICE SESSION MANAGEMENT

FIELD

The present invention relates to network assisted proximity service session management. More specifically, the present invention exemplarily relates to measures (including methods, apparatuses and computer program products) for realizing network assisted proximity service session management.

BACKGROUND

The present specification generally relates to proximity service peer discovery as well as proximity service session management (i.e. session set-up and session release), which is assisted by the network, to which the communication subscribers of such proximity service session are connected.

Proximity services of Long Term Evolution (LTE) are just started to be feasibility studied by the 3rd Generation Partnership Project (3GPP) system aspects working group 1 (SA1), which substantially defines the service requirements for 3GPP systems, under work item "Feasibility Study for Proximity-based Services" (FS_ProSe). At that, the main service scenario for proximity services under LTE is identified as peer-to-peer (P2P) communication between terminals.

That is, a direct terminal to terminal communication without a detour via the network takes place in proximity service communication. Thereby, terminals implementing LTE proximity services will utilize LTE licensed spectrum for direct communication with other terminals for e.g. data sharing.

If a set-up of such proximity service communication is based on a pure peer-to-peer fashion, e.g. the layer 1/2 techniques as Bluetooth, a considerable risk for a terminal of being hacked by denial of service (DoS) attacks arises. Even in case of no attack but of a normal communication request (connection initiation) from another proximity service terminal, it is difficult for the called terminal (receiving subscriber) to authenticate the user identity in the calling party (initiating subscriber).

Hence, the problem arises that a communication set-up performed by only the involved proximity service subscribers, i.e. the terminals intended to perform terminal to terminal communication entails security risks for the involved subscribers and that usage of LTE licensed band in case of such independent connection management is uncontrolled.

Consequently, there is a need to provide for network assisted proximity service session management.

Since this new aspect of LTE is totally different from traditional telecommunications services in LTE, there is no related technical background available.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method comprising discovering a proximity service target, said proximity service target providing proximity service, and setting up, via uplink and downlink signaling, proximity service communication with said proximity service target.

The method may be a method of a terminal, a user equipment, a mobile station or a modem.

According to an exemplary aspect of the present invention, there is provided a method comprising receiving a signaling comprising a proximity service request for setting up a proximity service communication, and forwarding said signaling comprising said proximity service request.

The method may be a method of a base station or an access node of a cellular system.

According to an exemplary aspect of the present invention, there is provided a method comprising receiving a signaling comprising a proximity service request for setting up a proximity service communication between an initiating communication subscriber and a receiving communication subscriber, said proximity service request comprises at least an identity of said initiating communication subscriber and an identity of said receiving communication subscriber, verifying authorization of said proximity service communication based on said identities, and forwarding, upon affirmative result of verification, said signaling comprising said proximity service request.

The method may be a method of a network node.

According to an exemplary aspect of the present invention, there is provided an apparatus comprising a control module configured to discover a proximity service target, said proximity service target providing proximity service, and a connection controller configured to set up, via uplink and downlink signaling, proximity service communication with said proximity service target.

According to an exemplary aspect of the present invention, there is provided an apparatus comprising a connection controller configured to receive a signaling comprising a proximity service request for setting up a proximity service communication, and to forward said signaling comprising said proximity service request.

According to an exemplary aspect of the present invention, there is provided an apparatus comprising a connection controller configured to receive a signaling comprising a proximity service request for setting up a proximity service communication between an initiating communication subscriber and a receiving communication subscriber, said proximity service request comprises at least an identity of said initiating communication subscriber and an identity of said receiving communication subscriber, and a control module configured to verify authorization of said proximity service communication based on said identities, wherein said connection controller is further configured to forward, upon affirmative result of verification, said signaling comprising said proximity service request.

According to an exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related exemplary aspects of the present invention.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables an efficient network-based proximity service session management as well as an efficient control of LTE licensed band.

By way of exemplary embodiments of the present invention, there is provided network assisted proximity service session management. More specifically, by way of exemplary embodiments of the present invention, there are provided measures and mechanisms for realizing network assisted proximity service session management.

Thus, improvement is achieved by methods, apparatuses and computer program products enabling/realizing network assisted proximity service session management.

BRIEF DESCRIPTION OF THE DRAWINGS

In the following, the present invention will be described in greater detail by way of non-limiting examples with reference to the accompanying drawings, in which.

DETAILED DESCRIPTION OF DRAWINGS AND EMBODIMENTS OF THE PRESENT INVENTION

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. In particular, communication LTE or LTE-Advanced systems and proximity services in such systems are used as non-limiting examples for the applicability of thus described exemplary embodiments. As such, the description of exemplary embodiments given herein specifically refers to terminology which is directly related thereto. Such terminology is only used in the context of the presented non-limiting examples, and does naturally not limit the invention in any way. Rather, any other communication or communication related system deployment, etc. may also be utilized as long as compliant with the features described herein.

In particular, the present invention and its embodiments may be applicable in any network compound in which terminals are connected via access nodes to a network, a communication is generally controlled by network nodes of the network, and the terminals are capable of performing inter-terminal communication.

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to exemplary embodiments of the present invention, in general terms, there are provided measures and mechanisms for (enabling/realizing) network assisted proximity service session management.

Figure 7:
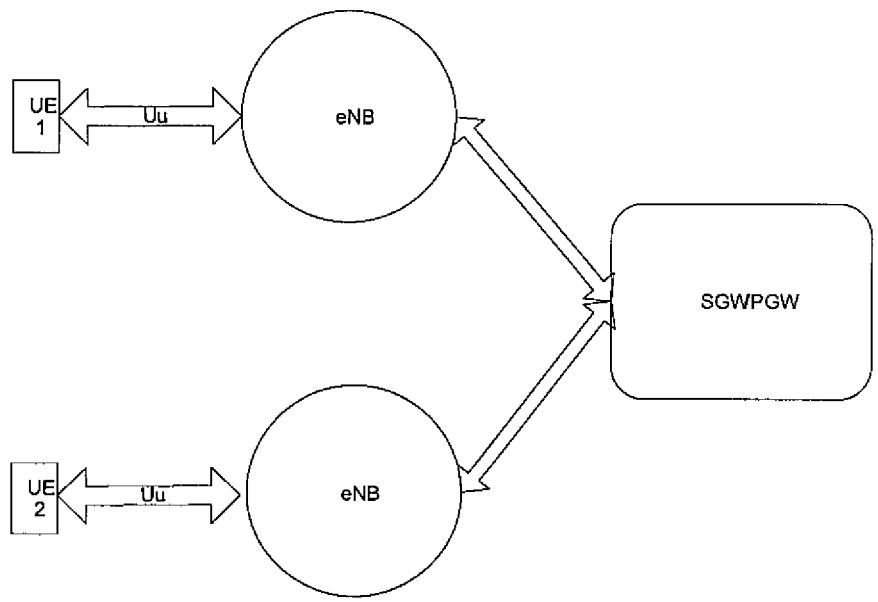
FIG. 7 is a schematic diagram illustrating exemplary network communication in e.g. LTE network deployments.

FIG. 7 is a schematic diagram illustrating exemplary network communication in e.g. LTE network deployments.

As shown in FIG. 7, in traditional LTE communication, the traffic is passed from a user equipment #1 (UE) through an evolved NodeB (eNB) (to which UE#1 is attached) and gateways (i.e. serving gateway (S-GW), packet data network gateway (P-GW)) in the network. Further, in traditional LTE communication, traffic between two UEs is passed from a UE#1 through the eNB to which UE#1 is attached, via gateways (i.e. S-GW, P-GW), through the eNB to which UE#2 is attached, to UE#2.

Figure 8:
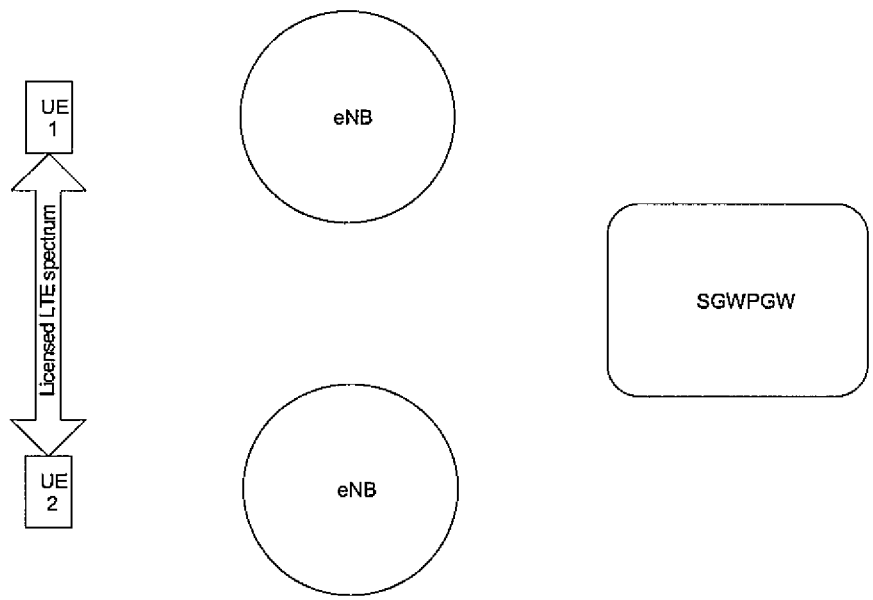
FIG. 8 is a schematic diagram illustrating exemplary proximity communication in e.g. LTE network deployments.

FIG. 8 is a schematic diagram illustrating exemplary proximity communication in e.g. LTE network deployments.

As shown in FIG. 8, traffic between two UEs is directly transmitted from UE#1 to UE#2 using LTE licensed spectrum and by bypassing the remaining network elements.

Such communication case requires a different way of communication party discovery, party authentication and communication set-up and release, which includes determination of the neighbor relationship between the involved terminals and configuration of service sessions.

According to exemplary embodiments of the present invention, satisfaction of those requirements is assisted by the network, in particular by certain network elements.

Figure 9:
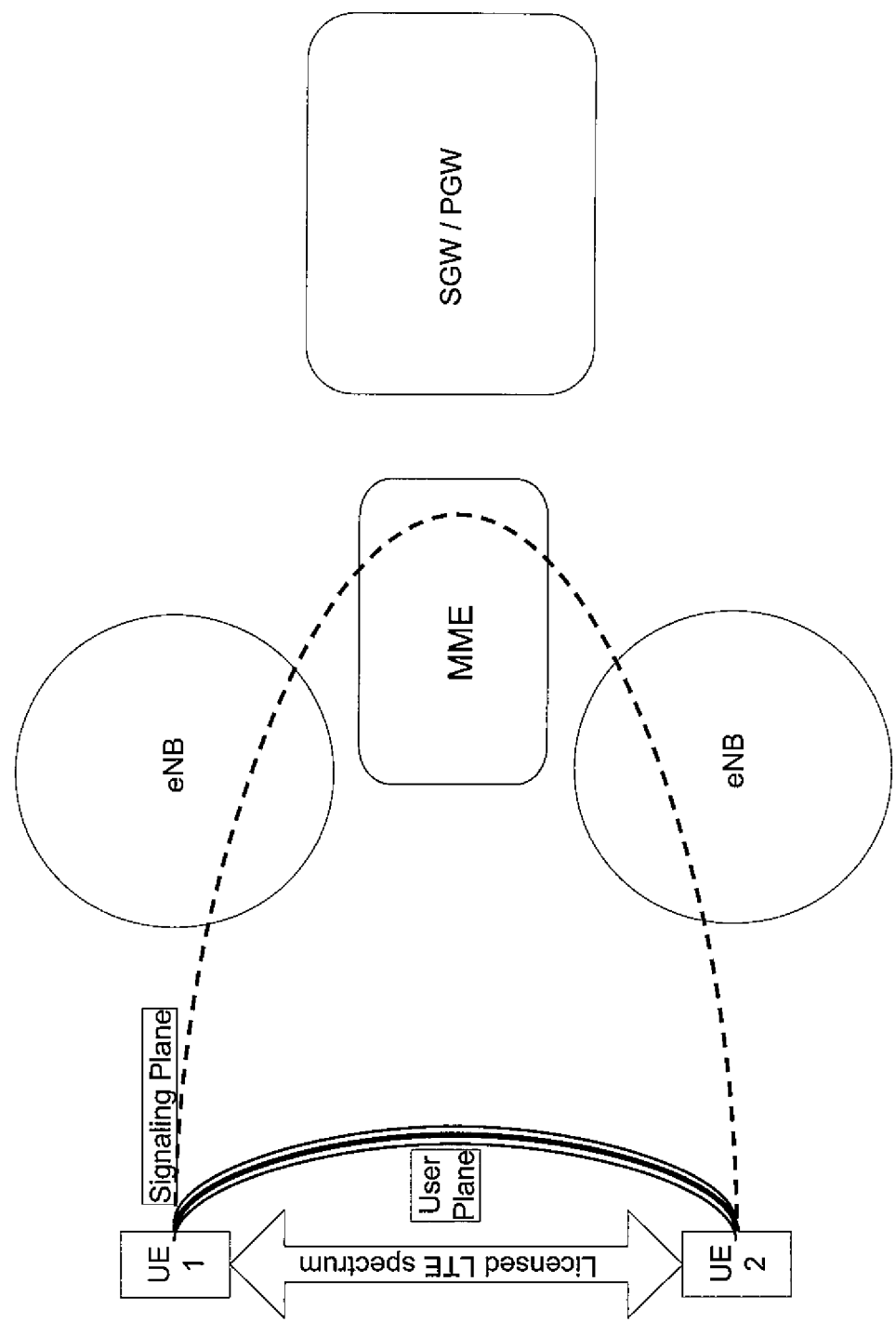
FIG. 9 is a schematic diagram illustrating exemplary proximity communication which is network controlled according to exemplary embodiments of the present invention.

FIG. 9 is a schematic diagram illustrating exemplary proximity communication which is network controlled according to exemplary embodiments of the present invention.

As shown in FIG. 9, an operator controlled proximity service model can be achieved according to exemplary embodiments of the present invention by assisting the involved terminals in session set-up and session release of a terminal to terminal communication. In particular, control information necessary for session set-up and session release (i.e. session set-up request, session release request, acknowledgements) are transmitted via signalings using the network, necessary actions (i.e. authentication) are performed by the network (in particular by certain network elements), whereas payload data is transmitted in a terminal-to-terminal communication.

From the operator's view, in order not to leave the usage of the LTE licensed band uncontrolled, proximity services in LTE licensed band are intended to be treated as subscription based services. Hence, according to exemplary embodiments of the present invention an authorization for using proximity services in the (thus controlled) LIE licensed band is enforced. In the exemplary LTE deployment, such authorization is performed by a mobility management entity (MME).

In such an operator controlled proximity service model according to exemplary embodiments of the present invention, the problems of proximity service neighbor discovery and the trusted (authenticated) session set-up can be solved.

According to exemplary embodiments of the present invention, the LTE evolved packet core (EPC) MME assists a proximity terminal (i.e. a terminal providing proximity service and possibly searching for terminals also providing proximity service) in discovering the neighbor terminals and in setting up proximity service connections.

Figure 10:
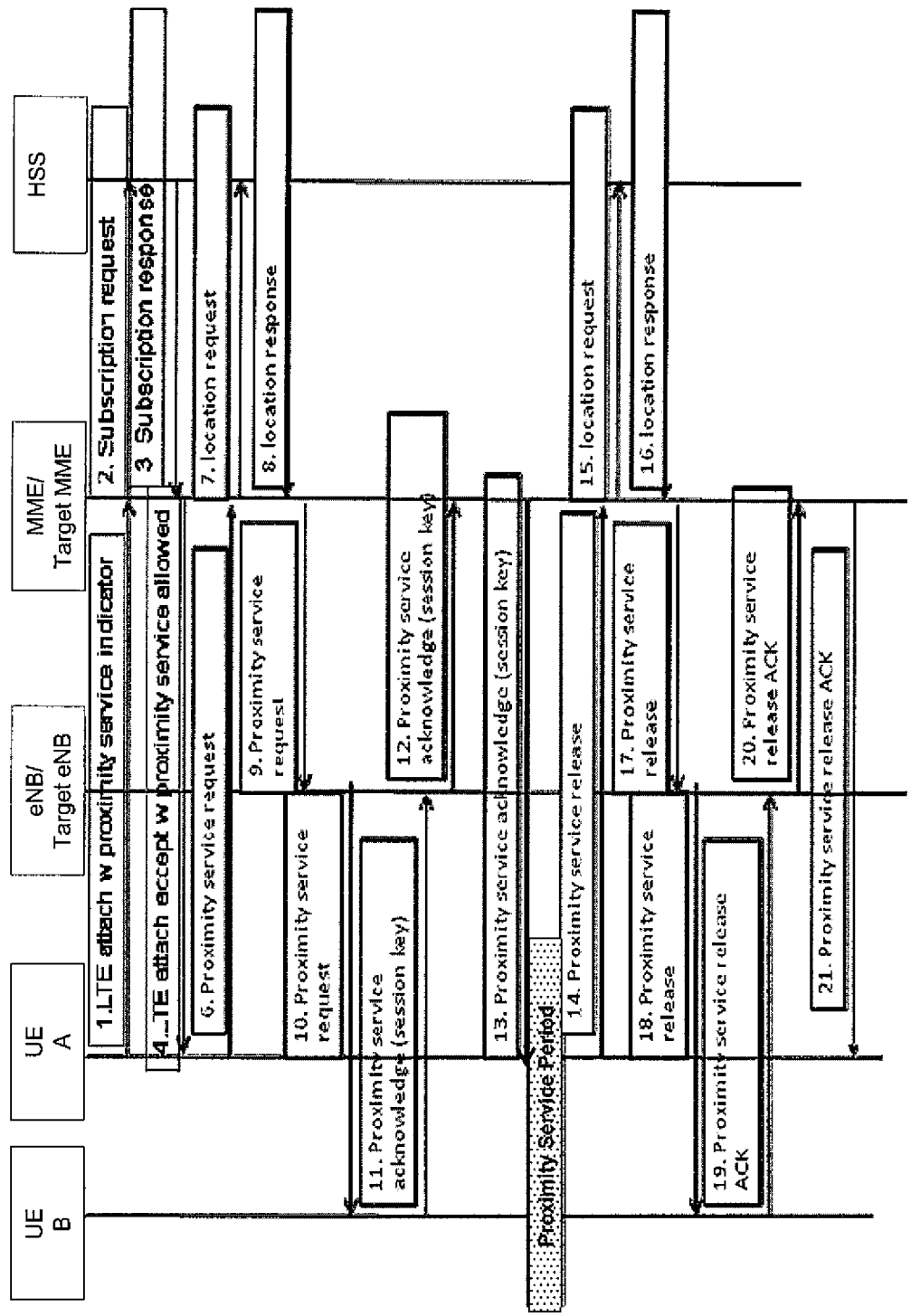
FIG. 10 is a schematic diagram illustrating signaling sequences according to exemplary embodiments of the present invention.

FIG. 10 is a schematic diagram illustrating signaling sequences according to exemplary embodiments of the present invention.

As shown in FIG. 10, the steps 1 to 4 represent known behavior of attaching of a terminal to an eNB and a MME, respectively, and the procedure of subscribing to a certain service with the HSS. Further, the steps 6 onwards represent the new behavior according to exemplary embodiments of the present invention, which is also described in detail below. It can be seen that the UE, the MME and the eNB are implemented with the behavior and features according to exemplary embodiments of the present invention.

In the LTE proximity service mode according to exemplary embodiments of the present invention, when UE#1 (UE A, terminal B) discovers another proximity service UE#2 (UE B, terminal B) in a certain distance with its layer 1/2 mechanism, terminals A and B can exchange their terminal identities. This identity could be a network access identifier (NAI), a mobile station international subscriber directory number (MSISDN), a Layer 2 medium access control (MAC) address, a nick name defined by the terminal user, etc. It is noted that the identities can be transmitted using a radio link in various ways. Preferably, a known technique of interchanging the identities is to be used.

When UE A (initiating subscriber) intends to initiate a proximity service with UE B (receiving subscriber), according to exemplary embodiments of the present invention UE A transmits a proximity service request to the assigned MME (via the assigned eNB). At that, the proximity service request includes at least UE A's identity and UE B's identity. It is to be noted that at this moment the proximity service terminal discovery is already done.

Subsequently, according to exemplary embodiments of the present invention the MME checks the subscriptions of both. In other words, the MME checks whether both UE A as well as UE B are attached to the MME with a proximity service indicator, and whether a proximity service subscription request transmitted to a superior home subscriber server (HSS) is affirmative responded prior to the proximity service request.

If the authorization condition is met, that is, if both UE A as well as UE B are subscribed for proximity services, the MME sends the proximity service request via the eNB to which UE B is assigned to UE B.

In case UE B intends to permit such requested proximity service session, it transmits a proximity service acknowledgement (ACK) to the assigned MME (via the assigned eNB). The proximity service acknowledgement message from UE B is then sent to UE A from MME via the eNB to which UE A is assigned. According to exemplary embodiments of the present invention, the proximity service acknowledgement message contains session key information, which enables ciphered direct communication between UE A and UE B.

It is to be noted that according to exemplary embodiments of the present invention special cases can be handled, which need additional procedures to complete the proximity service request.

In detail, although UE A and UE B can successfully discover each other, it is possible that they are served by different MMEs, especially in a case that MME pool is deployed. In such a case, the MME to which the initiating subscriber (i.e. UE A) is assigned is aware that the target UE (receiving subscriber UE B) is not in its coverage. According to exemplary embodiments of the present invention, the MME looks up (location request) the superior HSS for the location of the receiving subscriber (UE B) and forwards, based on a received location response, the proximity service request to the MME to which the receiving subscriber (i.e. UE B) is assigned.

A second special case is that the involved UEs are served by different eNBs, although both UEs are registered to the same MME. According to exemplary embodiments of the present invention, the MME finds the proper target eNB (to which UE B is assigned) to send the proximity service request due to the information regarding the assignment of the UE B.

The behavior according to exemplary embodiments of the present invention in case UE A or UE B intends to end the proximity service is similar to the behavior in case of the set-up of a proximity service session.

In detail, the UE indenting to stop the session transmits a release message via (assigned eNB and) assigned MME to the communication peer, i.e. the other UE via its assigned eNB (and MME if needed). The above stated special cases are similarly handled.

Figure 1:
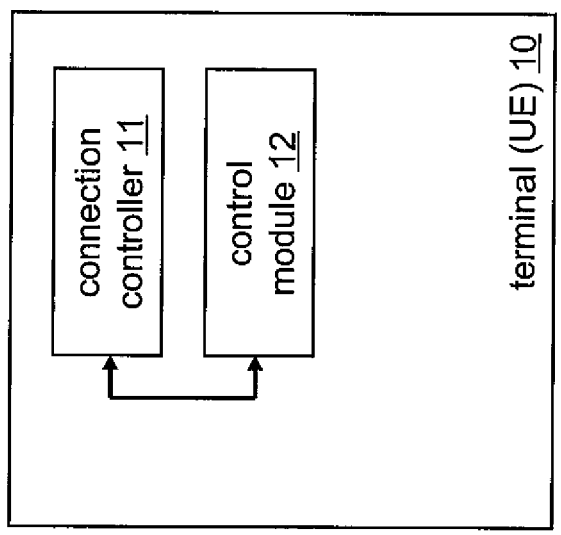
FIG. 1 is a block diagram illustrating an apparatus according to exemplary embodiments of the present invention.

FIG. 1 is a block diagram illustrating an apparatus according to exemplary embodiments of the present invention.

As shown in FIG. 1, according to exemplary embodiments of the present invention, the apparatus is a terminal 10 comprising a connection controller 11 and a control module 12. The control module 12 discovers a proximity service target. At that, the proximity service target provides proximity service. The connection controller 11 sets up, via uplink and downlink signaling, proximity service communication with said proximity service target.

According to further exemplary embodiments of the present invention, the connection controller 11, as part of the setting up, transmits an uplink signaling comprising a proximity service request, said proximity service request comprises at least an own identity and a proximity service target identity, and receives a downlink signaling comprising a proximity service acknowledgement, said proximity service acknowledgement comprises at least a session key for ciphering said proximity service communication.

According to further exemplary embodiments of the present invention, the connection controller 11, as part of the setting up, receives a downlink signaling comprising a proximity service request, said proximity service request comprises at least a proximity service target identity, and transmits an uplink signaling comprising a proximity service acknowledgement, said proximity service acknowledgement comprises at least a session key for ciphering said proximity service communication.

According to further exemplary embodiments of the present invention, the connection controller 11, as part of the setting up, performs the intended proximity service communication with the proximity service target based on the proximity service acknowledgement.

According to further exemplary embodiments of the present invention, the connection controller 11 further releases, via uplink and downlink signaling, said proximity service communication with said proximity service target.

According to further exemplary embodiments of the present invention, the connection controller 11, as part of the releasing, transmits an uplink signaling comprising a proximity service release request, and receives a downlink signaling comprising a proximity service release acknowledgement.

According to further exemplary embodiments of the present invention, the connection controller 11, as part of the releasing, receives a downlink signaling comprising a proximity service release request, and transmits an uplink signaling comprising a proximity service release acknowledgement.

According to further exemplary embodiments of the present invention, the connection controller 11, as part of the releasing, stops the proximity service communication with said proximity service target based on said proximity service release acknowledgement.

It is to be noted that the apparatus as shown in FIG. 1 may be operable as or at a terminal, user equipment, mobile station or modem, and may be operable in at least one of a LTE and a LTE-A cellular system.

Further, the proximity service communication may be a peer-to-peer communication, and the own identity and the proximity service target identity may be one of a network access identifier NAI, a mobile station international subscriber directory number MSISDN, a medium access control address, or a nick name.

Figure 2:
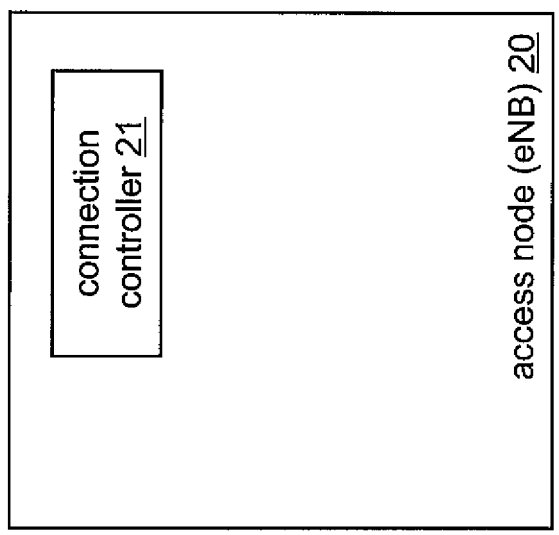
FIG. 2 is a block diagram illustrating an apparatus according to exemplary embodiments of the present invention.

FIG. 2 is a block diagram illustrating an apparatus according to exemplary embodiments of the present invention.

As shown in FIG. 2, according to exemplary embodiments of the present invention, the apparatus is an access node 20 comprising a connection controller 21. The connection controller 21 receives a signaling comprising a proximity service request for setting up a proximity service communication.

Further, the connection controller forwards the signaling comprising said proximity service request.

According to further exemplary embodiments of the present invention, the connection controller 21 receives a signaling comprising a proximity service acknowledgement indicative of acceptance of said proximity service communication and forwards said signaling comprising said proximity service acknowledgement.

According to further exemplary embodiments of the present invention, the connection controller 21 receives a signaling comprising a proximity service release request for releasing said proximity service communication, and forwards said signaling comprising said proximity service release request.

According to further exemplary embodiments of the present invention, the connection controller 21 receives a signaling comprising a proximity service release acknowledgement indicative of acceptance of release of said proximity service communication and forwards said signaling comprising said proximity service release acknowledgement.

It is to be noted that the apparatus as shown in FIG. 2 may be operable as or at a base station or access node of a cellular system. In particular, the apparatus as shown in FIG. 2 may be operable as or at an eNB. Further, the apparatus as shown in FIG. 2 may be operable in at least one of a LTE and a LTE-A cellular system.

Further, the proximity service communication may be a peer-to-peer communication.

Figure 3:
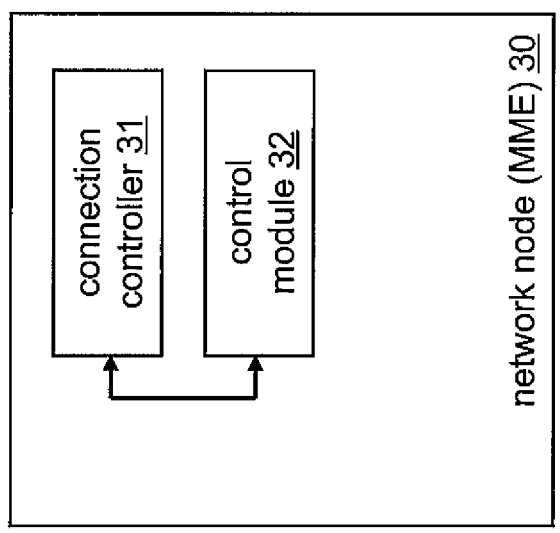
FIG. 3 is a block diagram illustrating an apparatus according to exemplary embodiments of the present invention.

FIG. 3 is a block diagram illustrating an apparatus according to exemplary embodiments of the present invention.

As shown in FIG. 3, according to exemplary embodiments of the present invention, the apparatus is a network node 30 comprising a connection controller 31 and a control module 32. The connection controller 31 receives a signaling comprising a proximity service request for setting up a proximity service communication between an initiating communication subscriber and a receiving communication subscriber, said proximity service request comprises at least an identity of said initiating communication subscriber and an identity of said receiving communication subscriber. The control module 32 verifies authorization of said proximity service communication based on said identities. Further, the connection controller 31 forwards, upon affirmative result of verification, said signaling comprising said proximity service request.

According to further exemplary embodiments of the present invention, the control module 32, as part of the forwarding, checks for responsibility based on said identity of said receiving communication subscriber. Further, the connection controller 31, as part of the forwarding, transmits, upon negative result of check, a signaling comprising a location request for looking up responsibility for said receiving communication subscriber, receives, upon negative result of check, a signaling comprising a location response indicative of responsibility for said receiving communication subscriber, and transmits, based on said location response, said signaling comprising said proximity service request.

According to further exemplary embodiments of the present invention, the connection controller 31 receives a signaling comprising a proximity service acknowledgement indicative of acceptance of said proximity service communication and forwards said signaling comprising said proximity service acknowledgement.

According to further exemplary embodiments of the present invention, the connection controller 31 receives a signaling comprising a proximity service release request for releasing said proximity service communication, and forwards said signaling comprising said proximity service release request.

According to further exemplary embodiments of the present invention, the control module 32, as part of the forwarding, checks for responsibility based on said identity of said receiving communication subscriber. Further, the connection controller 31, as part of the forwarding the signaling comprising said proximity service release request, transmits, upon negative result of check, a signaling comprising a location request for looking up responsibility for said receiving communication subscriber, receives, upon negative result of check, a signaling comprising a location response indicative of responsibility for said receiving communication subscriber, and transmits, based on said location response, said signaling comprising said proximity service release request.

According to further exemplary embodiments of the present invention, the connection controller 31 receives a signaling comprising a proximity service release acknowledgement indicative of acceptance of release of said proximity service communication and forwards said signaling comprising said proximity service release acknowledgement.

It is to be noted that the apparatus as shown in FIG. 3 may be operable as or at a network node of a cellular system. In particular, the apparatus as shown in FIG. 3 may be operable as or at an MME. Further, the apparatus as shown in FIG. 3 may be operable in at least one of a LTE and a LTE-A cellular system.

Further, the proximity service communication may be a peer-to-peer communication, and the identity of said initiating communication subscriber and the identity of said receiving communication subscriber may be one of a network access identifier NAI, a mobile station international subscriber directory number MSISDN, a medium access control address, or a nick name.

Figure 4:
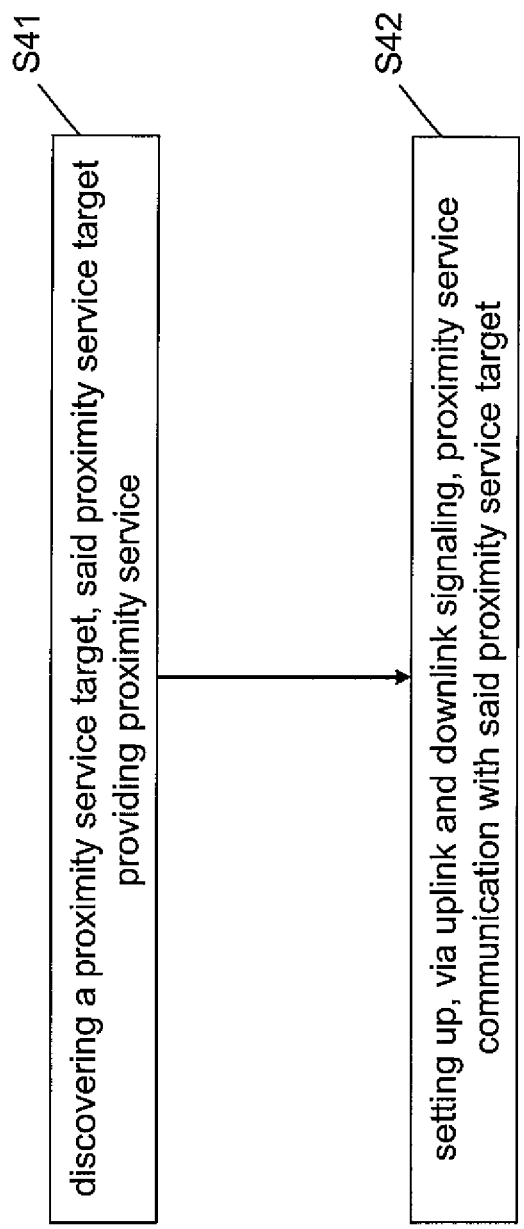
FIG. 4 is a schematic diagram of a procedure according to exemplary embodiments of the present invention.

FIG. 4 is a schematic diagram of a procedure according to exemplary embodiments of the present invention.

As shown in FIG. 4, a procedure according to exemplary embodiments of the present invention comprises an operation of discovering a proximity service target, said proximity service target providing proximity service, and an operation of setting up, via uplink and downlink signaling, proximity service communication with said proximity service target.

According to a variation of the procedure shown in FIG. 4, exemplary details of the setting up operation are given, which are inherently independent from each other as such.

Such exemplary setting up operation according to exemplary embodiments of the present invention may comprise an operation of transmitting an uplink signaling comprising a proximity service request, said proximity service request comprises at least an own identity and a proximity service target identity, and an operation of receiving a downlink signaling comprising a proximity service acknowledgement, said proximity service acknowledgement comprises at least a session key for ciphering said proximity service communication.

According to a variation of the procedure shown in FIG. 4, exemplary details of the setting up operation are given, which are inherently independent from each other as such.

Such exemplary setting up operation according to exemplary embodiments of the present invention may comprise an operation of receiving a downlink signaling comprising a proximity service request, said proximity service request comprises at least a proximity service target identity, and an operation of transmitting an uplink signaling comprising a proximity service acknowledgement, said proximity service acknowledgement comprises at least a session key for ciphering said proximity service communication.

According to a variation of the procedure shown in FIG. 4, exemplary details of the setting up operation are given, which are inherently independent from each other as such.

Such exemplary setting up operation according to exemplary embodiments of the present invention may comprise an operation of performing said proximity service communication with said proximity service target based on said proximity service acknowledgement.

According to a variation of the procedure shown in FIG. 4, exemplary additional operations are given, which are inherently independent from each other as such. According to such variation, an exemplary method according to exemplary embodiments of the present invention may comprise an operation of releasing, via uplink and downlink signaling, said proximity service communication with said proximity service target.

According to a variation of the procedure shown in FIG. 4, exemplary details of the releasing operation are given, which are inherently independent from each other as such.

Such exemplary releasing operation according to exemplary embodiments of the present invention may comprise an operation of transmitting an uplink signaling comprising a proximity service release request, and an operation of receiving a downlink signaling comprising a proximity service release acknowledgement.

Such exemplary releasing operation according to exemplary embodiments of the present invention may comprise an operation of receiving a downlink signaling comprising a proximity service release request, and an operation of transmitting an uplink signaling comprising a proximity service release acknowledgement.

Such exemplary releasing operation according to exemplary embodiments of the present invention may comprise an operation of stopping said proximity service communication with said proximity service target based on said proximity service release acknowledgement.

Figure 5:
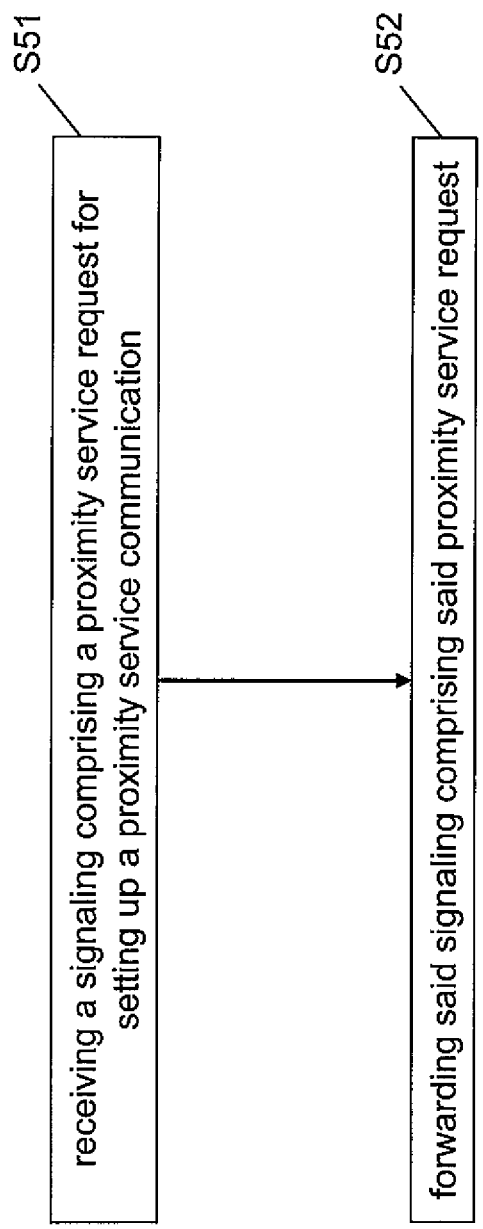
FIG. 5 is a schematic diagram of a procedure according to exemplary embodiments of the present invention.

FIG. 5 is a schematic diagram of a procedure according to exemplary embodiments of the present invention.

As shown in FIG. 5, a procedure according to exemplary embodiments of the present invention comprises an operation of receiving a signaling comprising a proximity service request for setting up a proximity service communication, and an operation of forwarding said signaling comprising said proximity service request.

According to a variation of the procedure shown in FIG. 5, exemplary additional operations are given, which are inherently independent from each other as such. According to such variation, an exemplary method according to exemplary embodiments of the present invention may comprise an operation of receiving a signaling comprising a proximity service acknowledgement indicative of acceptance of said proximity service communication, and an operation of forwarding said signaling comprising said proximity service acknowledgement.

According to a variation of the procedure shown in FIG. 5, exemplary additional operations are given, which are inherently independent from each other as such. According to such variation, an exemplary method according to exemplary embodiments of the present invention may comprise an operation of receiving a signaling comprising a proximity service release request for releasing said proximity service communication, and an operation of forwarding said signaling comprising said proximity service release request.

According to a variation of the procedure shown in FIG. 5, exemplary additional operations are given, which are inherently independent from each other as such. According to such variation, an exemplary method according to exemplary embodiments of the present invention may comprise an operation of receiving a signaling comprising a proximity service release acknowledgement indicative of acceptance of release of said proximity service communication, and an operation of forwarding said signaling comprising said proximity service release acknowledgement.

Figure 6:
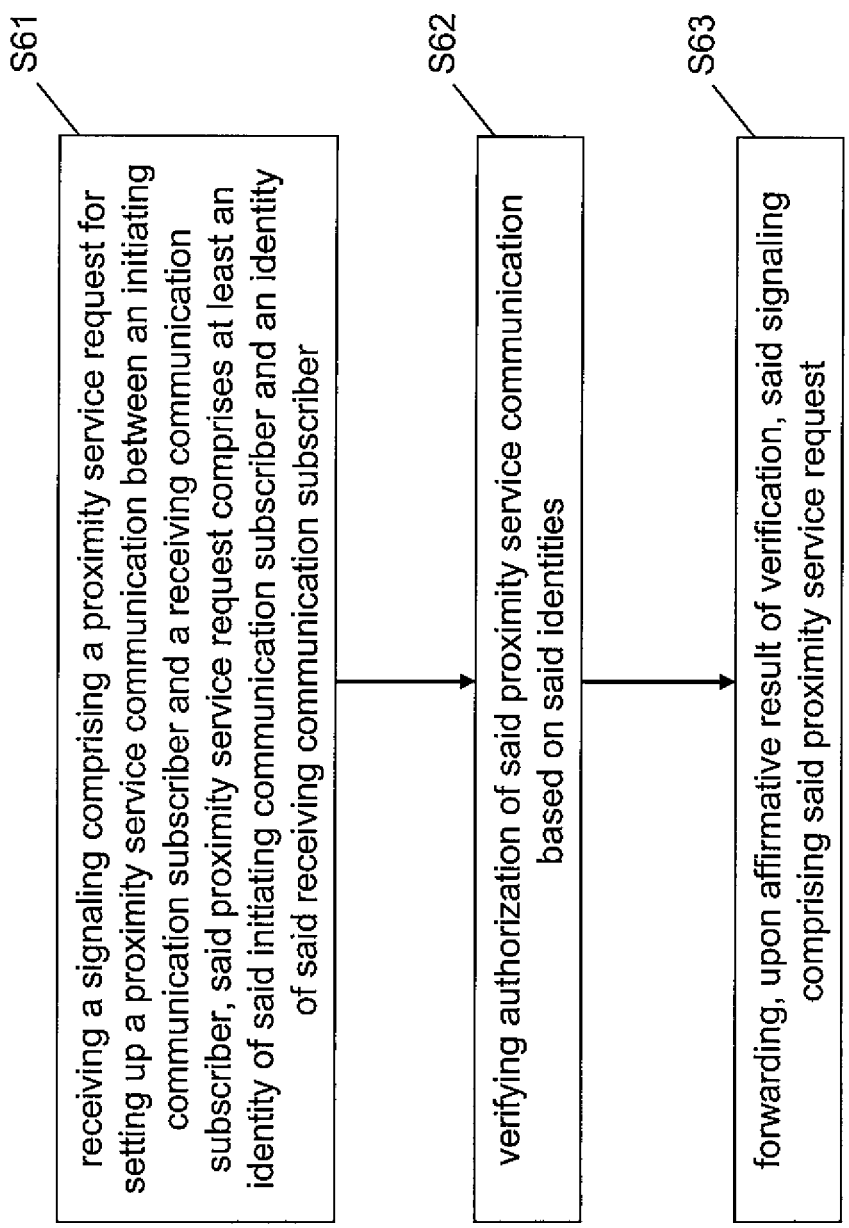
FIG. 6 is a schematic diagram of a procedure according to exemplary embodiments of the present invention.

FIG. 6 is a schematic diagram of a procedure according to exemplary embodiments of the present invention.

As shown in FIG. 6, a procedure according to exemplary embodiments of the present invention comprises an operation of receiving a signaling comprising a proximity service request for setting up a proximity service communication between an initiating communication subscriber and a receiving communication subscriber, said proximity service request comprises at least an identity of said initiating communication subscriber and an identity of said receiving communication subscriber, an operation of verifying authorization of said proximity service communication based on said identities, and an operation of forwarding, upon affirmative result of verification, said signaling comprising said proximity service request.

According to a variation of the procedure shown in FIG. 6, exemplary details of the forwarding operation are given, which are inherently independent from each other as such.

Such exemplary forwarding operation according to exemplary embodiments of the present invention may comprise an operation of checking for responsibility based on said identity of said receiving communication subscriber, an operation of transmitting, upon negative result of check, a signaling comprising a location request for looking up responsibility for said receiving communication subscriber, an operation of receiving, upon negative result of check, a signaling comprising a location response indicative of responsibility for said receiving communication subscriber, and an operation of transmitting, based on said location response, said signaling comprising said proximity service request.

According to a variation of the procedure shown in FIG. 6, exemplary additional operations are given, which are inherently independent from each other as such. According to such variation, an exemplary method according to exemplary embodiments of the present invention may comprise an operation of receiving a signaling comprising a proximity service acknowledgement indicative of acceptance of said proximity service communication, and an operation of forwarding said signaling comprising said proximity service acknowledgement.

According to a variation of the procedure shown in FIG. 6, exemplary additional operations are given, which are inherently independent from each other as such. According to such variation, an exemplary method according to exemplary embodiments of the present invention may comprise an operation of receiving a signaling comprising a proximity service release request for releasing said proximity service communication, and an operation of forwarding said signaling comprising said proximity service release request.

According to a variation of the procedure shown in FIG. 6, exemplary details of the forwarding said signaling comprising said proximity service release request operation are given, which are inherently independent from each other as such.

Such exemplary forwarding operation according to exemplary embodiments of the present invention may comprise an operation of checking for responsibility based on said identity of said receiving communication subscriber, an operation of transmitting, upon negative result of check, a signaling comprising a location request for looking up responsibility for said receiving communication subscriber, an operation of receiving, upon negative result of check, a signaling comprising a location response indicative of responsibility for said receiving communication subscriber, and an operation of transmitting, based on said location response, said signaling comprising said proximity service release request.

According to a variation of the procedure shown in FIG. 6, exemplary additional operations are given, which are inherently independent from each other as such. According to such variation, an exemplary method according to exemplary embodiments of the present invention may comprise an operation of receiving a signaling comprising a proximity service release acknowledgement indicative of acceptance of release of said proximity service communication, and an operation of forwarding said signaling comprising said proximity service release acknowledgement.

The above-described procedures and functions may be implemented by respective functional elements, processors, or the like, as described below.

In the foregoing exemplary description of the network entities, only the units that are relevant for understanding the principles of the invention have been described using functional blocks. The network entities may comprise further units that are necessary for its respective operation. However, a description of these units is omitted in this specification. The arrangement of the functional blocks of the devices is not construed to limit the invention, and the functions may be performed by one block or further split into sub-blocks.

When in the foregoing description it is stated that the apparatus, i.e. network entity (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 11:
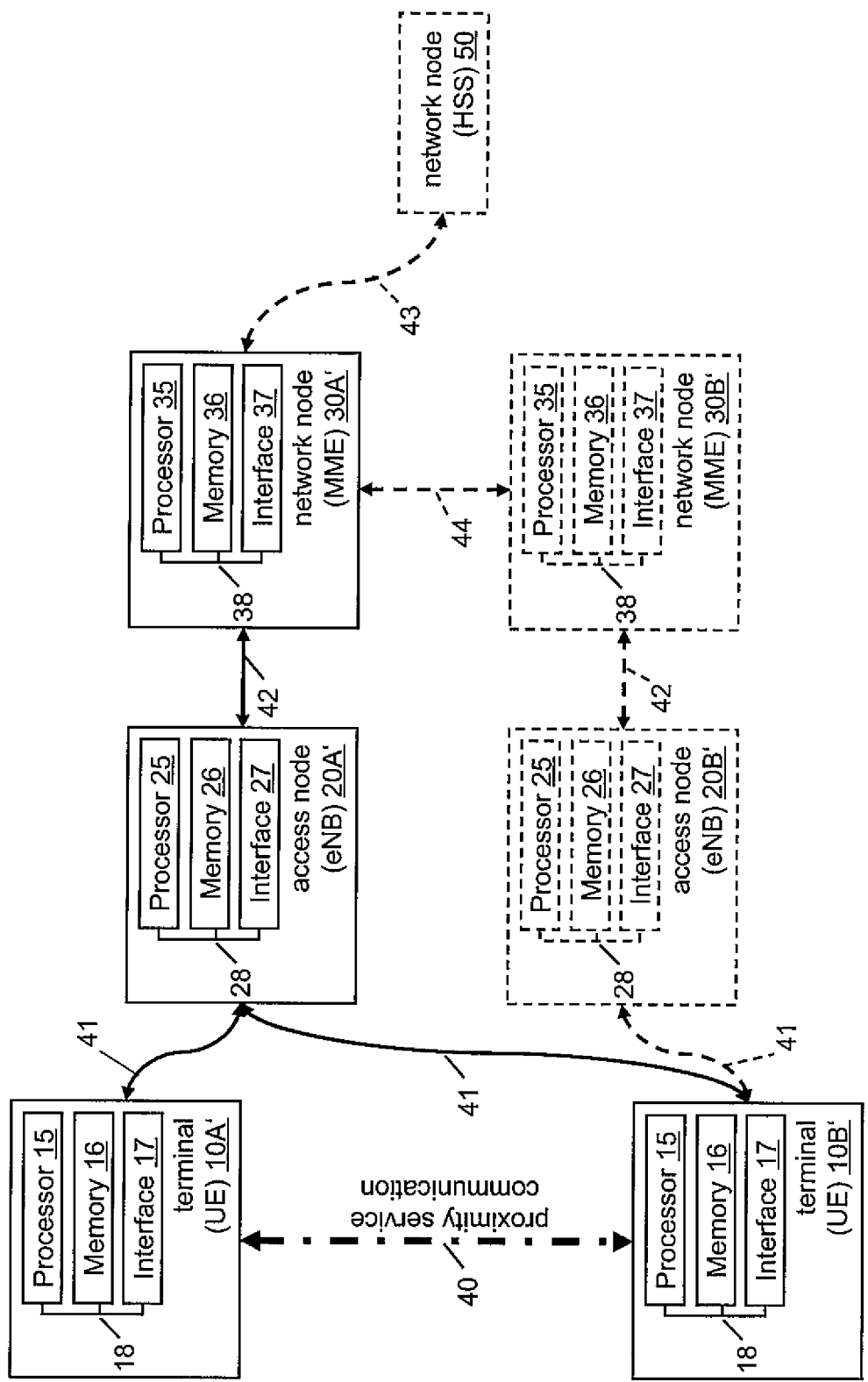
FIG. 11 is a block diagram alternatively illustrating apparatuses according to exemplary embodiments of the present invention.

In FIG. 11, an alternative illustration of apparatuses according to exemplary embodiments of the present invention is depicted. As indicated in FIG. 11, according to exemplary embodiments of the present invention, the apparatus (terminal) 10A', 10B' (corresponding to the terminal 10) comprises a processor 15, a memory 16 and an interface 17, which are connected by a bus 18 or the like. Further, according to exemplary embodiments of the present invention, the apparatus (access node) 20A', 20B' (corresponding to the access node 20) comprises a processor 25, a memory 26 and an interface 27, which are connected by a bus 28 or the like. Further, according to exemplary embodiments of the present invention, the apparatus (network node) 30A', 30B' (corresponding to the network node 30) comprises a processor 35, a memory 36 and an interface 37, which are connected by a bus 38 or the like, and the apparatuses may be connected via links 40, 41, 42, 43, 44, respectively. It is to be noted that the dashed objects represent objects, which may be present and/or necessary in the above stated special cases, i.e. that the UEs are not assigned to the same eNB and/or MME, and that a location request is to be effected with the superior HSS.

The processor 15/25/35 and/or the interface 17/27/37 may also include a modem or the like to facilitate communication over a (hardwire or wireless) link, respectively. The interface 17/27/37 may include a suitable transceiver coupled to one or more antennas or communication means for (hardwire or wireless) communications with the linked or connected device(s), respectively. The interface 17/27/37 is generally configured to communicate with at least one other apparatus, i.e. the interface thereof.

The memory 16/26/36 may store respective programs assumed to include program instructions or computer program code that, when executed by the respective processor, enables the respective electronic device or apparatus to operate in accordance with the exemplary embodiments of the present invention.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to exemplary embodiments of the present invention, an apparatus representing the terminal 10 comprises at least one processor 15, at least one memory 16 including computer program code, and at least one interface 17 configured for communication with at least another apparatus. The processor (i.e. the at least one processor 15, with the at least one memory 16 and the computer program code) is configured to perform discovering a proximity service target, said proximity service target providing proximity service (thus the apparatus comprising corresponding means for discovering), and to perform setting up, via uplink and downlink signaling, proximity service communication with said proximity service target (thus the apparatus comprising corresponding means for setting up).

According to exemplary embodiments of the present invention, an apparatus representing the access node 20 comprises at least one processor 25, at least one memory 26 including computer program code, and at least one interface 27 configured for communication with at least another apparatus. The processor (i.e. the at least one processor 25, with the at least one memory 26 and the computer program code) is configured to perform receiving a signaling comprising a proximity service request for setting up a proximity service communication (thus the apparatus comprising corresponding means for receiving), and to perform forwarding said signaling comprising said proximity service request (thus the apparatus comprising corresponding means for forwarding).

According to exemplary embodiments of the present invention, an apparatus representing the network node 30 comprises at least one processor 35, at least one memory 36 including computer program code, and at least one interface 37 configured for communication with at least another apparatus. The processor (i.e. the at least one processor 35, with the at least one memory 36 and the computer program code) is configured to perform receiving a signaling comprising a proximity service request for setting up a proximity service communication between an initiating communication subscriber and a receiving communication subscriber, said proximity service request comprises at least an identity of said initiating communication subscriber and an identity of said receiving communication subscriber (thus the apparatus comprising corresponding means for receiving), to perform verifying authorization of said proximity service communication based on said identities (thus the apparatus comprising corresponding means for verifying), and to perform forwarding, upon affirmative result of verification, said signaling comprising said proximity service request (thus the apparatus comprising corresponding means for forwarding).

For further details regarding the operability/functionality of the individual apparatuses, reference is made to the above description in connection with any one of FIGS. 1 to 11, respectively.

For the purpose of the present invention as described herein above, it should be noted that method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BIMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for network assisted proximity service session management. Such measures exemplarily comprise discovering a proximity service target, said proximity service target providing proximity service, and setting up, via uplink and downlink signaling, proximity service communication with said proximity service target.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP 3rd Generation Partnership Project
ACK acknowledgement
DoS denial of service
eNB evolved NodeB
EPC evolved packet core
FS_ProSe Feasibility Study for Proximity-based Services
HSS home subscriber server
LTE Long Term Evolution
MAC medium access control
MME mobility management entity
MSISDN mobile station international subscriber directory number
NAI network access identifier
P-GW packet data network gateway
P2P peer-to-peer
S-GW serving gateway
SA1 system aspects 1
UE user equipment

What is claimed is:

1. A method comprising:
discovering at a user equipment a proximity service target, said proximity service target providing proximity service;
receiving an acknowledgment at the user equipment from a network entity, after discovering the proximity service target, that both the user equipment and the proximity service target are subscribed for the proximity service;
setting up, via uplink and downlink signaling, proximity service communication between the user equipment and said proximity service target;
receiving a downlink signaling comprising a proximity service acknowledgement, said proximity service acknowledgement comprises at least a session key for ciphering said proximity service communication between the user equipment and the proximity service target;
releasing, via the uplink and the downlink signaling, said proximity service communication with said proximity service target;
transmitting the uplink signaling comprising a proximity service release request; and
receiving the downlink signaling comprising a proximity service release acknowledgement.

2. The method according to claim 1, wherein, in relation to said setting up, said method further comprises:
transmitting the uplink signaling comprising a proximity service request, said proximity service request comprises at least an own identity and a proximity service target identity.

3. The method according to claim 1, wherein, in relation to said setting up, said method further comprises:
receiving the downlink signaling comprising a proximity service request, said proximity service request comprises at least a proximity service target identity; and
transmitting the uplink signaling comprising a proximity service acknowledgement, said proximity service acknowledgement comprises at least a session key for ciphering said proximity service communication.

4. The method according to claim 1, wherein, in relation to said setting up, said method further comprises:
performing said proximity service communication with said proximity service target based on said proximity service acknowledgement.

5. The method according to claim 1, wherein, in relation to said releasing, said method further comprises:
receiving the downlink signaling comprising a proximity service release request; and
transmitting the uplink signaling comprising a proximity service release acknowledgement.

6. The method according to claim 1, wherein, in relation to said releasing, said method further comprises
stopping said proximity service communication with said proximity service target based on said proximity service release acknowledgement.

7. The method according to claim 1, wherein at least one of
the method is operable at or by a terminal, user equipment, mobile station or modem, or
the method is operable in at least one of a LTE and a LTE-A cellular system, or
said proximity service communication is a peer-to-peer communication, or
said own identity is one of a network access identifier NAI, a mobile station international subscriber directory number MSISDN, a medium access control address, or a nick name, or
said proximity service target identity is one of a network access identifier NAI, a mobile station international subscriber directory number MSISDN, a medium access control address, or a nick name.

8. A method comprising:
receiving a signaling from a user equipment comprising a proximity service request for setting up a proximity service communication between the user equipment and a proximity service target;
forwarding said signaling comprising said proximity service request;

receiving acknowledgment at a network entity that both the user equipment and the proximity service target are subscribed for the proximity service;

receiving a signaling comprising a proximity service release request for releasing said proximity service communication;

forwarding said signaling comprising said proximity service release request;

receiving a signaling comprising a proximity service release acknowledgement indicative of acceptance of release of said proximity service communication; and forwarding said signaling comprising said proximity service release acknowledgement, wherein the acknowledgement comprises session key information enabling ciphered direct communication between the user equipment and the proximity service target.

9. The method according to claim 8, further comprising receiving a signaling comprising a proximity service acknowledgement indicative of acceptance of said proximity service communication; and forwarding said signaling comprising said proximity service acknowledgement.

10. The method according to claim 8, wherein at least one of the method is operable at or by a base station or access node of a cellular system, or the method is operable in at least one of a LTE and a LTE-A cellular system, or said proximity service communication is a peer-to-peer communication.

11. A method comprising:

receiving a signaling comprising a proximity service request for setting up a proximity service communication between an initiating communication subscriber and a receiving communication subscriber, said proximity service request comprises at least an identity of said initiating communication subscriber and an identity of said receiving communication subscriber;

verifying authorization of said proximity service communication based on said identities of the initiating communication subscriber and the identity of said receiving communication subscriber, wherein the authorization indicates that both the initiating communication subscriber and the receiving communication subscriber are subscribed for the proximity service;

forwarding an acknowledgement to the initiating communication subscriber upon affirmative result of verification;

receiving a signaling comprising a proximity service release request for releasing said proximity service communication;

forwarding said signaling comprising said proximity service release request;

checking for a subscription based on said identity of said receiving communication subscriber; and transmitting, upon negative result of check, a signaling comprising a location request for looking up the subscription for said receiving communication subscriber.

12. The method according to claim 11, further comprising receiving a signaling comprising a proximity service acknowledgement indicative of acceptance of said proximity service communication; and forwarding said signaling comprising said proximity service acknowledgement.

13. The method according to claim 11, further comprising receiving a signaling comprising a proximity service release acknowledgement indicative of acceptance of release of said proximity service communication; and forwarding said signaling comprising said proximity service release acknowledgement.

14. The method according to claim 11, wherein at least one of the method is operable at or by a network node of a cellular system, the method is operable in at least one of a LTE and a LTE-A cellular system, said proximity service communication is a peer-to-peer communication; or said identity of said initiating communication subscriber is one of a network access identifier NAI, a mobile station international subscriber directory number MSISDN, a medium access control address, or a nick name; or said identity of said receiving communication subscriber is one of a network access identifier NAI, a mobile station international subscriber directory number MSISDN, a medium access control address, or a nick name.

15. A method comprising:

receiving a signaling comprising a proximity service request for setting up a proximity service communication between an initiating communication subscriber and a receiving communication subscriber, said proximity service request comprises at least an identity of said initiating communication subscriber and an identity of said receiving communication subscriber;

verifying authorization of said proximity service communication based on said identities of the initiating communication subscriber and the identity of said receiving communication subscriber, wherein the authorization indicates that both the initiating communication subscriber and the receiving communication subscriber are subscribed for the proximity service; and forwarding an acknowledgement to the initiating communication subscriber upon affirmative result of verification, wherein, in relation to said forwarding, said method further comprises:

checking for a subscription based on said identity of said receiving communication subscriber;

transmitting, upon negative result of check, a signaling comprising a location request for looking up the subscription for said receiving communication subscriber;

receiving, upon negative result of check, a signaling comprising a location response indicative of the subscription for said receiving communication subscriber; and transmitting, based on said location response, said signaling comprising said proximity service request.

16. A method comprising:

receiving a signaling comprising a proximity service request for setting up a proximity service communication between an initiating communication subscriber and a receiving communication subscriber, said proximity service request comprises at least an identity of said initiating communication subscriber and an identity of said receiving communication subscriber;

verifying authorization of said proximity service communication based on said identities of the initiating communication subscriber and the identity of said receiving communication subscriber, wherein the authorization indicates that both the initiating communication subscriber and the receiving communication subscriber are subscribed for the proximity service;

forwarding an acknowledgement to the initiating communication subscriber upon affirmative result of verification;

receiving a signaling comprising a proximity service release request for releasing said proximity service communication; and forwarding said signaling comprising said proximity service release request, wherein, in relation to said forwarding said signaling comprising said proximity service release request, said method further comprises:

checking for a subscription based on said identity of said receiving communication subscriber;

transmitting, upon negative result of check, a signaling comprising a location request for looking up the subscription for said receiving communication subscriber;

receiving, upon negative result of check, a signaling comprising a location response indicative of the subscription for said receiving communication subscriber; and transmitting, based on said location response, said signaling comprising said proximity service release request.

17. An apparatus comprising:

at least one processor; and at least one memory including computer program code, wherein the at least one memory and the computer program code are configured to, with the at least one processor, cause the apparatus at least to:

discover at a user equipment a proximity service target, said proximity service target providing proximity service;

receive an acknowledgment at the user equipment from a network entity, after discovering the proximity service target, that both the user equipment and the proximity service target are subscribed for the proximity service;

set up, via uplink and downlink signaling, proximity service communication between the user equipment with said proximity service target; and receive the downlink signaling comprising a proximity service acknowledgement, said proximity service acknowledgement comprises at least a session key for ciphering said proximity service communication between the user equipment and the proximity service target;

release, via the uplink signaling and the downlink signaling, said proximity service communication with said proximity service target;

transmit the uplink signaling comprising a proximity service release request; and receive the downlink signaling comprising a proximity service release acknowledgement.

18. The apparatus according to claim 17, wherein said at least one memory and the computer program code are further configured to, with the at least one processor, cause the apparatus at least to transmit the uplink signaling comprising a proximity service request, said proximity service request comprises at least an own identity and a proximity service target identity.

19. The apparatus according to claim 17, wherein said at least one memory and the computer program code are further configured to, with the at least one processor, cause the apparatus at least to receive the downlink signaling comprising a proximity service request, said proximity service request comprises at least a proximity service target identity; and transmit the uplink signaling comprising a proximity service acknowledgement, said proximity service acknowledgement comprises at least a session key for ciphering said proximity service communication.

20. The apparatus according to claim 17, wherein said at least one memory and the computer program code are further configured to, with the at least one processor, cause the apparatus at least to perform said proximity service communication with said proximity service target based on said proximity service acknowledgement.

21. The apparatus according to claim 17, wherein said at least one memory and the computer program code are further configured to, with the at least one processor, cause the apparatus at least to receive the downlink signaling comprising a proximity service release request; and to transmit an uplink signaling comprising a proximity service release acknowledgement.

22. The apparatus according to claim 17, wherein said at least one memory and the computer program code are further configured to, with the at least one processor, cause the apparatus at least to stop said proximity service communication with said proximity service target based on said proximity service release acknowledgement.

23. The apparatus according to claim 17, wherein at least one of the apparatus is operable as or at a terminal, user equipment, mobile station or modem, the apparatus is operable in at least one of a LTE and a LTE-A cellular system, said proximity service communication is a peer-to-peer communication;

said own identity is one of a network access identifier NAI, a mobile station international subscriber directory number MSISDN, a medium access control address, or a nick name; or said proximity service target identity is one of a network access identifier NAI, a mobile station international subscriber directory number MSISDN, a medium access control address, or a nick name.

24. An apparatus comprising:

a connection controller configured to receive a signaling from a user equipment comprising a proximity service request for setting up a proximity service communication between the user equipment and a proximity service target;

forward said signaling comprising said proximity service request;

receive acknowledgment at a network entity that both the user equipment and the proximity service target are subscribed for the proximity service;

receive a signaling comprising a proximity service release request for releasing said proximity service communication;

forward said signaling comprising said proximity service release request;

receive a signaling comprising a proximity service release acknowledgement indicative of acceptance of release of said proximity service communication; and forward said signaling comprising said proximity service release acknowledgement,
wherein the acknowledgement comprises session key information enabling ciphered direct communication between the user equipment and the proximity service target.

25. The apparatus according to claim 24, wherein said connection controller is further configured to
receive a signaling comprising a proximity service acknowledgement indicative of acceptance of said proximity service communication; and to
forward said signaling comprising said proximity service acknowledgement.

26. The apparatus according to claim 24, wherein at least one of
the apparatus is operable as or at a base station or access node of a cellular system,
the apparatus is operable in at least one of a LTE and a LTE-A cellular system, or
said proximity service communication is a peer-to-peer communication.

27. An apparatus comprising:
at least one processor; and
at least one memory including computer program code,
wherein the at least one memory and the computer program code are configured to, with the at least one processor, cause the apparatus at least to
receive a signaling comprising a proximity service request for setting up a proximity service communication between an initiating communication subscriber and a receiving communication subscriber, said proximity service request comprises at least an identity of said initiating communication subscriber and an identity of said receiving communication subscriber;
verify authorization of said proximity service communication based on said identities of the initiating communication subscriber and the identity of said receiving communication subscriber, wherein the authorization indicates that both the initiating communication subscriber and the receiving communication subscriber are subscribed for the proximity service;
forward an acknowledgement to the initiating communication subscriber upon affirmative result of verification;
receive a signaling comprising a proximity service release request for releasing said proximity service communication;
forward said signaling comprising said proximity service release request;
check for a subscription based on said identity of said receiving communication subscriber; and
transmit, upon negative result of check, a signaling comprising a location request for looking up the subscription for said receiving communication subscriber.

28. The apparatus according to claim 27, wherein said at least one memory and the computer program code are further configured to, with the at least one processor, cause the apparatus at least to
receive a signaling comprising a proximity service acknowledgement indicative of acceptance of said proximity service communication; and
forward said signaling comprising said proximity service acknowledgement.

29. The apparatus according to claim 27, wherein said at least one memory and the computer program code are further configured to, with the at least one processor, cause the apparatus at least to
receive a signaling comprising a proximity service release acknowledgement indicative of acceptance of release of said proximity service communication; and
forward said signaling comprising said proximity service release acknowledgement.

30. The apparatus according to claim 27, wherein at least one of
the apparatus is operable as or at a network node of a cellular system, or
the apparatus is operable in at least one of a LTE and a LTE-A cellular system, or
said proximity service communication is a peer-to-peer communication;
said identity of said initiating communication subscriber is one of a network access identifier NAI, a mobile station international subscriber directory number MSISDN, a medium access control address, or a nick name; or
said identity of said receiving communication subscriber is one of a network access identifier NAI, a mobile station international subscriber directory number MSISDN, a medium access control address, or a nick name.

31. An apparatus comprising:
at least one processor; and
at least one memory including computer program code,
wherein the at least one memory and the computer program code are configured to, with the at least one processor, cause the apparatus at least to
receive a signaling comprising a proximity service request for setting up a proximity service communication between an initiating communication subscriber and a receiving communication subscriber, said proximity service request comprises at least an identity of said initiating communication subscriber and an identity of said receiving communication subscriber;
verify authorization of said proximity service communication based on said identities of the initiating communication subscriber and the identity of said receiving communication subscriber, wherein the authorization indicates that both the initiating communication subscriber and the receiving communication subscriber are subscribed for the proximity service;
forward an acknowledgement to the initiating communication subscriber upon affirmative result of verification,
check for a subscription based on said identity of said receiving communication subscriber;
transmit, upon negative result of check, a signaling comprising a location request for looking up the subscription for said receiving communication subscriber;
to receive, upon negative result of check, a signaling comprising a location response indicative of the subscription for said receiving communication subscriber; and
transmit, based on said location response, said signaling comprising said proximity service request.

32. An apparatus comprising:
at least one processor; and
at least one memory including computer program code,
wherein the at least one memory and the computer program code are configured to, with the at least one processor, cause the apparatus at least to receive a signaling comprising a proximity service request for setting up a proximity service communication between an initiating communication subscriber and a receiving communication subscriber, said proximity service request comprises at least an identity of said initiating communication subscriber and an identity of said receiving communication subscriber;

verify authorization of said proximity service communication based on said identities of the initiating communication subscriber and the identity of said receiving communication subscriber, wherein the authorization indicates that both the initiating communication subscriber and the receiving communication subscriber are subscribed for the proximity service;

forward an acknowledgement to the initiating communication subscriber upon affirmative result of verification;

receive a signaling comprising a proximity service release request for releasing said proximity service communication;

forward said signaling comprising said proximity service release request, check for a subscription based on said identity of said receiving communication subscriber;

transmit, upon negative result of check, a signaling comprising a location request for looking up the subscription for said receiving communication subscriber;

to receive, upon negative result of check, a signaling comprising a location response indicative of the subscription for said receiving communication subscriber; and transmit, based on said location response, said signaling comprising said proximity service release request.

33. A computer program product comprising computer-executable computer program code embodied on a non-transitory computer-readable medium which, when the program is run on a computer, is configured to cause the computer to carry out the method according to claim 1.

* * * * *